United States Patent
Wozniak

(10) Patent No.: US 10,334,045 B2
(45) Date of Patent: Jun. 25, 2019

(54) INDICATING MULTIPLE ENCODING SCHEMES IN A DISPERSED STORAGE NETWORK

(71) Applicant: International Business Machines Corporation, Armonk, NY (US)

(72) Inventor: Ethan S. Wozniak, Park Ridge, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 366 days.

(21) Appl. No.: 15/174,531

(22) Filed: Jun. 6, 2016

(65) Prior Publication Data

US 2017/0353553 A1    Dec. 7, 2017

(51) Int. Cl.
*H04L 29/08* (2006.01)
*H04L 12/879* (2013.01)

(52) U.S. Cl.
CPC ........ *H04L 67/1097* (2013.01); *H04L 49/901* (2013.01)

(58) Field of Classification Search
None
See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay et al. |
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Krista M Zele
*Assistant Examiner* — Mohammad Yousuf A. Mian
(74) *Attorney, Agent, or Firm* — Garlick & Markison; Timothy W. Markison; Bruce E. Stuckman

(57) ABSTRACT

A method includes transmitting a first write request that includes a first encoded data slice of a first data object encoded under a first encoding scheme, and a first slice identifier corresponding to the first encoded data slice assigned to a first memory location of a distributed storage network (DSN) based on the first slice identifier. A second write request that includes a second encoded data slice of the first data object encoded under a second encoding scheme, and a second slice identifier corresponding to the second encoded data slice, is transmitted, and the second encoded data slice is assigned to a second memory location of the DSN based on the second slice identifier. A request to access the first data object is received. A derived second slice identifier is generated in response to determining that the first data object requested for access is stored under multiple encoding schemes.

14 Claims, 4 Drawing Sheets

(56) References Cited

U.S. PATENT DOCUMENTS

| | | |
|---|---|---|
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,013,314 B2 * | 3/2006 | Day .................. G06F 16/10 707/763 |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula |
| 2005/0132070 A1 | 6/2005 | Redlich et al. |
| 2005/0144382 A1 | 6/2005 | Schmisseur |
| 2005/0229069 A1 | 10/2005 | Hassner et al. |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters et al. |
| 2008/0154978 A1 * | 6/2008 | Lemar .................. G06F 16/166 |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2011/0029524 A1 * | 2/2011 | Baptist .................. G06F 11/1076 707/737 |
| 2014/0281817 A1 * | 9/2014 | Grube .................. G06F 11/1076 714/769 |
| 2015/0378822 A1 * | 12/2015 | Grube .................. G06F 11/1092 714/763 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 1511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner distributed computing system 10

INDICATING MULTIPLE ENCODING SCHEMES IN A DISPERSED STORAGE NETWORK

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not applicable.

BACKGROUND OF THE INVENTION

Technical Field of the Invention

Aspects of this invention relate generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

DETAILED DESCRIPTION OF THE INVENTION

Figure 1:
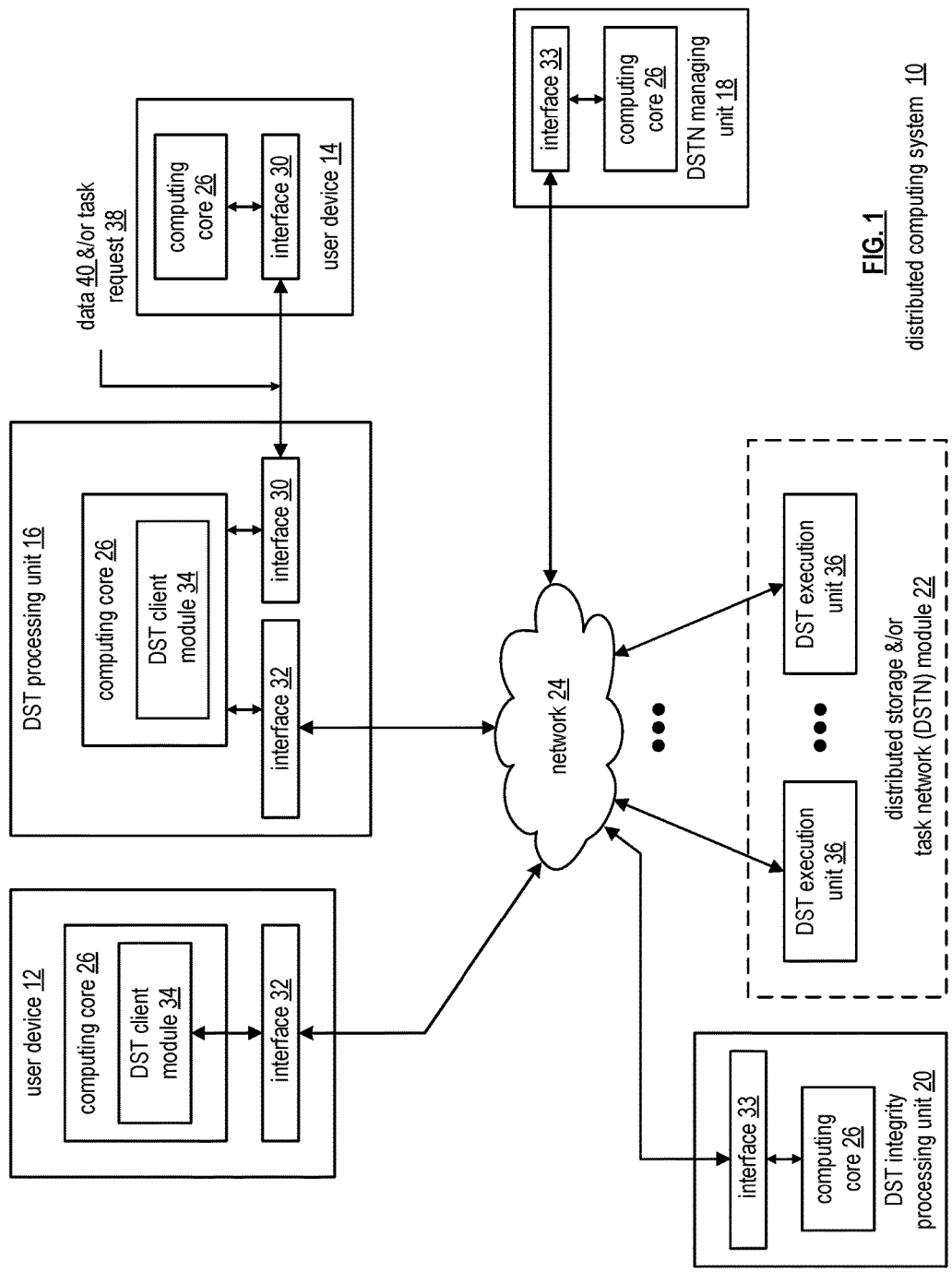
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN). Hereafter, the distributed computing system 10 may be interchangeably referred to as a dispersed storage network (DSN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, the DST execution unit may be interchangeably referred to as a storage unit and a set of DST execution units may be interchangeably referred to as a set of storage units.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval, and data storage integrity verification. In accordance with these three primary functions, data can be encoded (e.g., utilizing an information dispersal algorithm (IDA), utilizing a dispersed storage error encoding process), distributedly stored in physically different locations, and subsequently retrieved in a reliable and secure manner. Hereafter, distributedly stored may be interchangeably referred to as dispersed stored. Such a system is tolerant of a significant number of failures (e.g., up to a failure level, which may be greater than or equal to a pillar width (e.g., an IDA width of the IDA) minus a decode threshold minus one) that may result from individual storage device (e.g., DST execution unit 36) failures and/or network equipment failures without loss of data and without the need for a redundant or backup copy. Further, the distributed computing system 10 allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block associated with a portion of an overall namespace of the DSN) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated system registry information in one or more of the DSTN module 22, the user device 12, the DST processing unit 16, and the DST integrity processing unit 20.

The DS error encoding parameters (e.g., or dispersed storage error coding parameters for encoding and decoding) include data segmenting information (e.g., how many segments data (e.g., a file, a group of files, a data block, etc.) is divided into), segment security information (e.g., per segment encryption, compression, integrity checksum, etc.), error coding information (e.g., pillar/IDA width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

Each slice name is unique to a corresponding encoded data slice and includes multiple fields associated with the overall namespace of the DSN. The slice name can correspond to a particular memory location where the encoded data slice is stored. For example, the fields may include a pillar number/pillar index, a vault identifier, an object number uniquely associated with a particular file for storage, and a data segment identifier of a plurality of data segments, where the particular file is divided into the plurality of data segments. For example, each slice name of a set of slice names corresponding to a set of encoded data slices that has been dispersed storage error encoded from a common data segment varies only by entries of the pillar number field as each share a common vault identifier, a common object number, and a common data segment identifier.

To support distributed task processing on received data, the distributed computing system 10 has two primary operations: DST (distributed storage and/or task processing) management and DST execution on received data. With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. With respect to the DST management, it is substantially similar to the DST management to support distributed task processing on received data.

In various embodiments, data sent to a DST processing unit for storage by a user device 12-14 can include one or more data objects. Each data object can have a unique, corresponding object identifier, object name, or object ID. In various embodiments, the object ID can be generated deterministically based on the data object itself, generated based on the user device, generated sequentially, and/or generated randomly. The object ID can be generated by the user device or requesting entity, or can be generated by the DST processing unit after the data is received from the user device. A set of encoded data slices can be generated to store a particular data object, where the set of encoded data slices corresponding to the data object are stored in one or more storage units. A subset of the encoded data slices can be decoded to regenerate the original data object.

Figure 2:
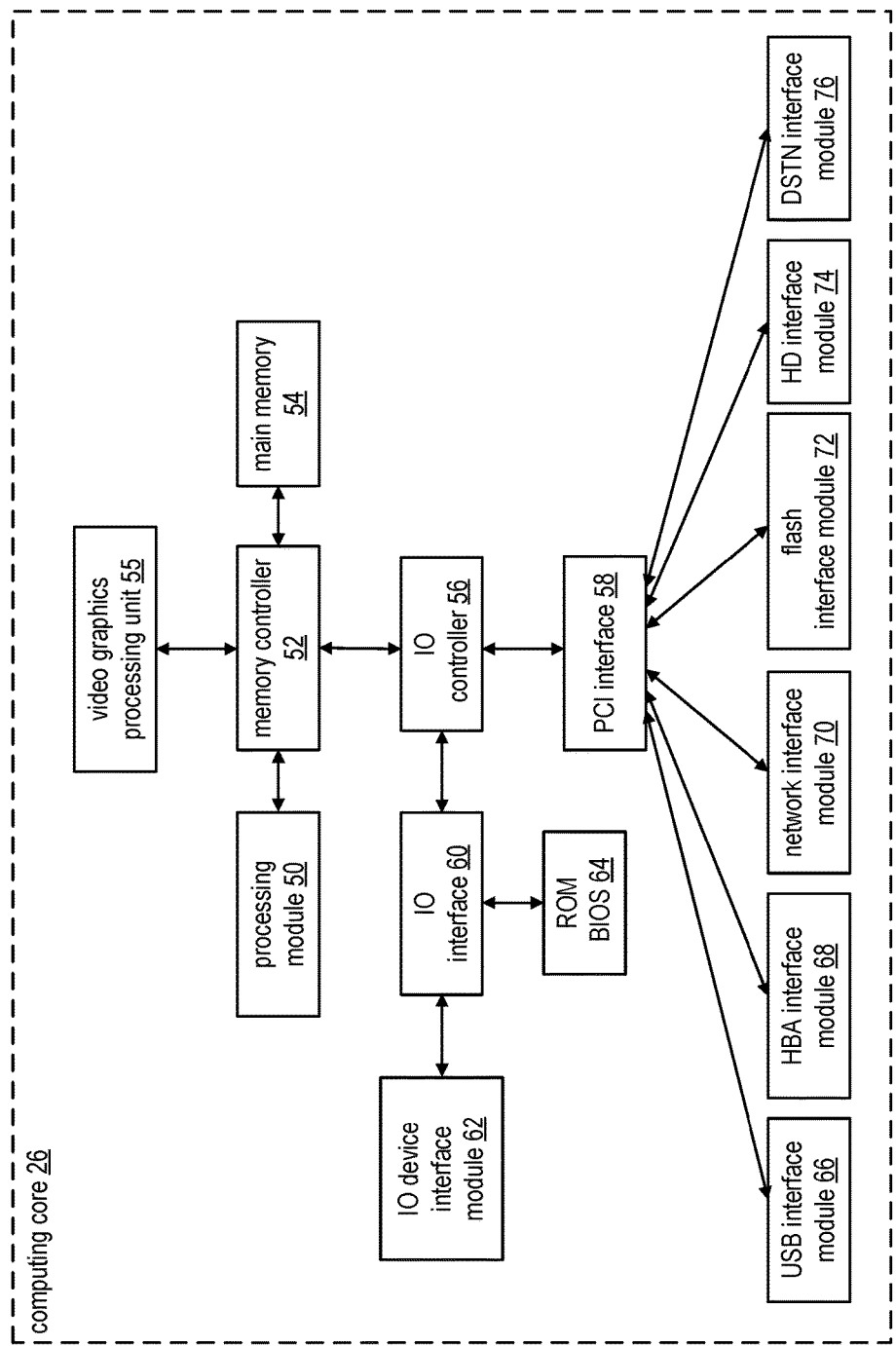
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
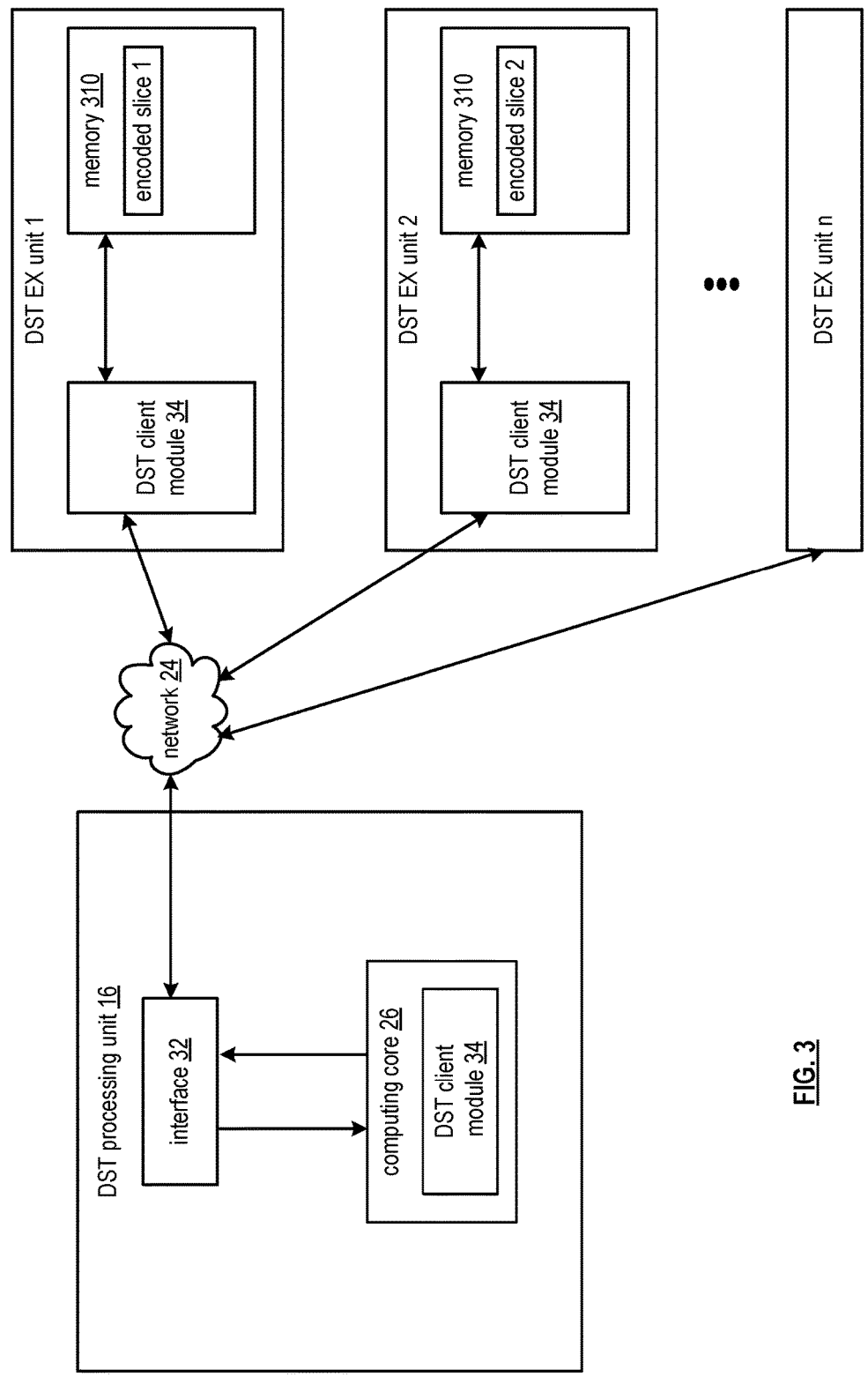
FIG. 3 is a schematic block diagrams of an embodiment of a dispersed storage network (DSN) in accordance with the present invention.

FIG. 3 is a schematic block diagram of another embodiment of a dispersed storage network (DSN) that includes the distributed storage and task (DST) processing unit 16 of FIG. 1, the network 24 of FIG. 1, and DST execution units 1-n. The DST processing unit 16 includes interface 32 of FIG. 1 and computing core 26 of FIG. 1, which includes DST client module 34 of FIG. 1. DST execution unit 1 stores encoded slice 1 in a memory 310 and DST execution unit 2 stores encoded slice 2 in a memory 310. Memory 310 can be utilized by main memory 54 of FIG. 2, or another memory module. DST execution units 1-n can each be implemented utilizing the DST execution unit 36 of FIG. 1. In various embodiments, a plurality of encoded slices can be distributed amongst the storage in different DST execution units 1-n. In various embodiments, a single DST execution unit can store a plurality of encoded slices distributed across multiple memories, files, and/or vaults of the particular DST execution unit. The DSN functions to indicate multiple encoding schemes. Hereafter, a DST execution unit may be interchangeably referred to as a storage unit, storage, and/or memory.

Some data objects stored in a DSN memory are encoded in multiple forms and/or schemes redundantly. In various embodiments, such data objects are stored with more than one set of Information Dispersal Algorithm (IDA) parameters. For example, one object may be stored with both a 10-of-16 "wide" IDA, and a 2-of-3 "narrow" IDA. It may not be evident whether an object has multiple encodes or not until it's metadata object is read, which may require many slice access requests to ascertain. In some cases, an attempt to read the alternate version first can result in a read failure and a wasted round trip time.

Alternately, some hints to the presence of an alternate object encoding may be placed in the object ID and/or object name itself, in those cases where the DST processing unit is at liberty to choose the object ID and/or object name. In various embodiments, a reserved field of the object ID, object name, and/or source name can be used to indicate whether a secondary encoding exists. In various embodiments, when no room exists in the object ID for an explicit field, a hint can be embedded by choosing otherwise uncommon or rare object IDs that have certain properties. For example, to indicate that multiple encoding forms exist, an object ID that happens to be a multiple of a large prime, such as 65537, could be selected. In this example, such an object ID can be expected to happen by chance only 1/65537 times, and so when it is true, provides a reliable clue that an alternate encoding exists for the object.

In order to determine the slice names for the secondary encoding, they must be deterministically derivable from the original object name. For example, using a hash function, or mask generating function, applied to the bits of the former object's source name, to derive the bits of the source name for the secondary encoding of the object. When a DST processing unit receives an access request for a given object, and its object name/object id has an indicator or hint that the object has a secondary encoding that is preferred to be read, then the DST processing unit will derive the secondary encoding source name, and then issue read requests for those slices.

In various embodiments, the DST processing unit receives an access request from a requesting entity. The request can be received over network 24 of FIG. 1. The requesting entity can utilize, for example, user device 12-14 of FIG. 1. The access request can include an object ID corresponding to a data object and/or the data object itself. The access request can include a read request, a write request, and/or a request to perform task, a function, and/or process on the object. If the access request includes a write request, the DST processing unit can generate at least one encoded data slice for storage based on the object ID and/or the data object itself by utilizing, for example, the DST client module 34 of FIG. 1, or via another processing module associated with DST processing unit. For example, a particular encoding scheme can be applied to the data object to generate an encoded slice, a set of encoded data slices, or multiple sets of encoded data slices. Hereafter at least one encoded slice can interchangeably refer to a single encoded slice, a set of encoded data slices, or multiple sets of encoded data slices that result from applying a particular encoding scheme to the data object. In various embodiments, an IDA encoding scheme can be applied to the data object to produce one or more sets of encoded data slices, where each set includes N encoded data slices and like encoded data slices (e.g., slice 3's) of two or more sets of encoded data slices are included in a common pillar (e.g., pillar 3). In various embodiments, the write request includes an indication of a particular scheme to be utilized by the DST processing unit when generating the at least one encoded slice. For example, the requesting entity can include IDA parameters corresponding in the request to indicate a particular IDA encoding scheme to be used when encoding the data object to generate the at least one encoded slice. In some embodiments, the DST processing unit can receive the at least one encoded data slice directly.

In various embodiments, the access request can include a slice identifier, or slice name, indicating at least one memory location where the at least one encoded data slice will be stored. The at least one memory location can include at least one vault, storage unit, and/or memory module that can store the at least one encoded slice. In various embodiments, a plurality of encoded data slices corresponding to a data object encoded under a particular encoding scheme can be stored in the same location or in different locations. In various embodiments, the slice name can indicate at least one DST execution unit of 36, at least one particular vault of a DST execution unit 36, at least one memory 54, or at least one particular file of memory 54. Given a slice name corresponding to an encoded slice, at least one location of corresponding to the at least one encoded slice in memory can be determined. This assigns at least one space in memory to the at least one encoded slice in the first write request. In subsequent access requests, the at least one location of the stored encoded data slice is determined from the slice name. In various embodiments, the slice name can be derived from the request, object ID, and/or data object itself. For example, the slice name can be determined by applying a deterministic function such as a hash or mask generating function to the object ID. In various embodiments, the object ID and the slice name can be identical.

In various embodiments, the DST processing unit can update the object ID of a data object to indicate that the data object is stored under multiple encoding schemes. Updating the object ID can include embedding a unique indicator in the object ID. In subsequent tests on the updated object ID, the DST processing unit can determine that the object ID includes this unique indicator to conclude that the data object is stored under multiple encoding schemes. In various embodiments, updating the object ID can include updating a reserved field of the object ID. In various embodiments, updating the object ID can include assigning the object ID to an identifier with a special, rare property, such assigning the object ID to be a large prime number or a multiple of a predetermined large prime number. In various embodiments, the object ID and/or one or more slice names corresponding to the encoded slices under multiple encoding schemes are derivable from the object ID. In various embodiments, the new object ID is transmitted back to the requesting entity. In various embodiments, the new object ID can be transmitted to several requesting entities and/or stored in a lookup table accessible by one or more requesting entities. In various embodiments, the new object ID, once known by the requesting entity, can be included in future access requests to the DST processing unit. In other embodiments, the new object ID can be stored in a lookup table accessible by the DST processing unit itself, mapped to the original object ID, and can be retrieved by the DST processing unit when an original object ID is included in a subsequent access request by a requesting entity.

In various embodiments, updating the object ID can include creating a new object ID by performing a reversible function on the current object ID. In particular, an ideal reversible function should always return an acceptable object ID when applied in the forward direction, and applying the inverse of the reversible function on any acceptable object ID should only return an acceptable object ID if the function was applied, and an unacceptable object ID otherwise. In such embodiments, the DST processing unit can test that the data object corresponding to an object ID corresponds to encoded data slices stored under multiple encoding schemes in storage by applying the inverse of the reversible function to the object ID and determining whether or not the result is also an object ID. For example, the function can include multiplying the object ID itself by a large prime number, and testing that an object ID corresponds to a data object stored under multiple encoding schemes can include dividing the object ID by the large prime number and checking that the quotient is an integer and/or checking that the quotient follows the format of an acceptable object ID. In various embodiments, the reversible function can be applied to a slice name of one of the encoded data slices. Applying a reversible function to the original object ID and/or one or more slice names allows the original object ID and/or one or more slice names to be recoverable.

In various embodiments, subsequent slice names, and thus location in storage, for additional encoded data slices or a data object stored under additional encoding schemes can be derivable from a first slice name corresponding to at least one first encoded data slice of a data object. For example, subsequent slice names can be determined using a deterministic function such as a hash function or a mask generating function given a first slice name.

In various embodiments, the first slice name of a data object is derivable from the original object ID of the data object by a first deterministic function h1(x) that takes the object ID as a parameter. At least one second encoded data slice of the data object is assigned a second slice name by applying a second deterministic function h2(x) that takes the first slice name as a parameter. The new object ID is created in response to storing the at least one second encoded data slice corresponding to the data object by applying a reversible function f(x) to the original object ID:

slice name1=$h1$(original object ID)

slice name2=$h2$(slice name1)

new object ID=$f$(original object ID)

In various embodiments, in response to receiving a request to access the data object, the DST processing unit can determine that the data object is stored under multiple encoding schemes by applying an inverse function on the new object ID to recover the original object ID. After the original object ID is recovered, and with the knowledge that there are encoded data slices under multiple encoding schemes corresponding to the data object, the DST processing unit can access a particular at least one encoded slice corresponding to a particular encoding scheme applied to the data object. In various embodiments, the at least one slices stored under both encoding schemes can be accessed as both slice names can be recovered from the original object ID:

original object ID=$f'$(new object ID)

slice name1=$h1$(original object ID)

slice name2=$h2$(slice name1)

In various embodiments, the reversible function can be applied to an original object ID multiple times to generate new object IDs corresponding to encoded slices of a data object encoded under subsequent encoding schemes, where the number of times the deterministic function is applied corresponds to the number of different encoded schemes correspond to encoded slices stored for the data object. For example, an already-updated object ID can be further updated in response to storing a at least one encoded slice, encoded under a subsequent encoding scheme, by applying the reversible function as before. In this fashion, an object ID can indicate exactly how many encoded schemes correspond to the stored encoded slices based on how many times the reversible function was applied to the original object ID. A first previous object ID can be derived by applying the inverse function of the reversible function on the newest object ID, a second previous object ID can be derived by applying the inverse function on the first previous object ID, etc. The number of times this process can continue until an unacceptable object ID is returned indicates how many times the reversible function was applied in the forward direction, and thus how many encoding schemes exist for the data object.

Similarly, the deterministic function used to generate the second slice name can be applied multiple times to generate new slice names corresponding to the subsequent encoding schemes. For example, a slice name corresponding to at least one third encoded slice can be generated by applying the second deterministic function to the second slice name, a slice name for at least one fourth encoded data slice can be generated by applying the second deterministic function to the third slice name, etc. In this fashion, a slice name corresponding to at least one an nth data slice can be generated, and later derived, by applying the second deterministic function to the n−1th slice name, by applying the second deterministic function to the first slice name n−1 times, or by applying the second deterministic function to the kth slice name n−k times.

In various embodiments, this recursive process of generating slice names can be used to indicate at least one encoded data slice stored under a preferred encoding scheme. For example, the at least one encoded data slice with a corresponding slice name generated by applying the second deterministic function n−1 times can correspond to at least one encoded data slice encoded under the preferred encoding scheme. Furthermore, the recursive process of generating slice names can be used to indicate a ranking of preferred encoding schemes. For example, at least one encoded data slice with a corresponding slice name generated by applying the second deterministic function n−1 times can correspond to the at least one encoded data slice encoded under the most preferred encoding scheme, at least one encoded data slice with a corresponding slice name generated by applying the second deterministic function n−2 times can correspond to the at least one encoded data slice encoded under the second most preferred encoding scheme, etc., where the slice name where the second deterministic function was never applied, corresponding to the at least one first encoded data slice can indicate that the at least one first encoded slice is encoded under the least preferred encoding scheme. In various embodiments, the encoded slices can be ranked in the reverse direction, where the at least one first encoded slice is the most preferred.

In various embodiments, object IDs generated by the DST processing unit can indicate a single preferred encoding scheme or a ranking of encoding schemes by employing different strategies. For example, generating new object IDs can include populating a field of the object ID to indicate a preferred encoded data slice, or a preferred type of encoding scheme. Such a field can also indicate a ranking of the encoded schemes. In various embodiments, the slice names for a data object can also include another indication of preference. For example, the slice name can include a field indicating a ranking relative to the slices encoded under other schemes for the data object, a binary field indicating if the corresponding at least one encoded slice is the preferred at least one slice, and/or a field that indicates the IDA parameters used. In various embodiments, such preference data can be embedded in the slice name by utilizing a reversible function, later derivable by applying an inverse of the reversible function.

In various embodiments, a preferred encoding scheme can be determined by the requesting entity and included in the access request. In various embodiments, a universal preferred encoding scheme or ranking of encoding schemes can be stored by the DST processing unit itself, and the at least one encoded slice accessed as a result of an access request can be a result of this universal preference or ranking. In various embodiments, the ranking of encoding schemes can differ for different data objects. In such embodiments, the DST processing unit can store a set of rules, which includes different encoding scheme rankings for different groups of data objects. The group that a given data object falls under can be determined deterministically based on, for example the object ID.

In various embodiments, the DST processing unit performs a test to determine if a generating a new object ID is necessary as the result of an access request. In particular, upon receiving a write request, the DST processing unit can determine if the write will result storing data slices for the data object under multiple encoding schemes. In various embodiments, if there are already encoded slices stored corresponding to two or more encoding schemes, the object ID itself will indicate that the data object is already stored under multiple encoded schemes, and the test performed can include the test to the object ID as previously discussed. In various embodiments, if only one or zero encoding schemes have been employed on the encoded slices currently stored for the data object, the DST processing unit will receive the original object ID, for example, because a new object ID would never have been generated by the DST processing unit. In such cases, the DST processing unit can perform additional tests to determine if a new object ID is necessary, for example, by determining if encoded slices corresponding to the data object exist in memory under exactly one encoding scheme. For example, the DST processing unit can query one or more storage units and/or search a lookup table to determine if at least one encoded slice corresponding to a single encoding scheme is already stored. In various embodiments, an indication that exactly one encoding scheme has been used can be included in the access request, for example, if the number of encoding schemes applied to the stored encoded slices for the data object is known by the requesting entity. In various embodiments, an indication that exactly one encoded scheme has been used is stored can be derivable from the object ID itself.

In various embodiments, to prevent the need for such additional tests, the reversible function previously discussed can be applied to the object ID after the first at least one encoded slice is stored, and as a result, performing the inverse function and recovering an object ID will indicate that data slices corresponding to at least one encoding scheme are already stored for the data object. In such embodiments, a new object ID will be created after every write request, although it will not definitively indicate the presence of multiple encoding schemes when received in subsequent access requests since the new object ID could also indicate the storage of at least one encoded slice corresponding to exactly one encoding scheme.

In various embodiments, when a write request to write a subsequent encoded slice for a data object is received, the DST processing unit can determine that a different encoding scheme should be used to generate the subsequent at least one encoded slice. For example, the DST processing unit can determine the encoding scheme used in an already stored at least one encoded slice for the data object based on its corresponding object ID, based on a test performed on the object ID, based on retrieving the encoded slice from storage, based on information in the access request, based on a type, size, and/or feature of the data object itself, and/or based on a lookup table. In various embodiments, the DST processing unit can choose which encoding scheme will be used on a received data object based on capacity and/or performance considerations of the DST processing unit itself, capacity and/or performance considerations of one or more vaults and/or storage units of the storage, a predefined protocol, and/or randomly. In some embodiments, the encoding scheme to be used to generate the at least one encoded slice can be included in the access request.

In various embodiments, the DST processing unit can update an object ID and/or encoded slice IDs in response to a deletion of at least one encoded data slice from storage. For example, a set of encoded data slices corresponding to a particular encoding scheme can be deleted from at least one memory location. This update can include a change to an indicated number of stored encoded slices and/or indicated number of encoding schemes that correspond to the stored encoded slices. This update can also include a change from an object ID indicating multiple encoding schemes to an object ID that does not indicate multiple encoded schemes. For example, the update can include reverting to an original object ID. In various embodiments, performing the update can include performing an inverse function of the reversible function on an object ID at least one time. In various embodiments, slice names can be swapped or regenerated, and corresponding encoded data slices can be moved to corresponding storage locations accordingly.

In various embodiments, a processing system of a DST processing unit includes at least one processor and a memory that stores operational instructions, that when executed by the at least one processor cause the processing system to transmit via a network a first write request that includes at least one first encoded data slice of a first data object that is encoded under a first encoding scheme, and a first slice identifier corresponding to the at least one first encoded data slice, which is assigned to at least one first memory location of a distributed storage network (DSN) based on the first slice identifier. A second write request that includes at least one second encoded data slice of the first data object that is encoded under a second encoding scheme, and a second slice identifier corresponding to the at least one second encoded data slice, is transmitted via the network, where the at least one second encoded data slice is assigned to at least one second memory location of the DSN based on the second slice identifier. A first access request to access the first data object is received via the network. A derived second slice identifier is generated in response to determining that the first data object requested for access is stored under multiple encoding schemes. A first read request that includes the derived second slice identifier to access the at least one second encoded data slice is transmitted via the network.

In various embodiments, the second slice identifier is generated by performing a deterministic function on the first slice identifier. A derived first slice identifier is generated based on the first access request, and the derived second slice identifier is generated by performing the deterministic function on the derived first slice identifier. In various embodiments, the deterministic function is a hash function or a mask generating function.

In various embodiments, a new first object identifier is generated to indicate the first data object. An original first object identifier that identifies the first data object is replaced with the new first object identifier. In various embodiments, the new first object identifier is transmitted to a requesting entity in response to generating the new first object identifier. The first access request is received from the requesting entity, and the first access request includes the new first object identifier.

In various embodiments, generating the new first object identifier includes updating a reserved field of the original first object identifier. A test is performed on the reserved field in response to receiving the new first object identifier in the first access request, and the derived second slice identifier is generated in response to a result of the test indicating that the first data object is stored under multiple encoding schemes. In various embodiments, the first encoding scheme corresponds to performing an information dispersal algorithm by utilizing a first set of parameters, and second encoding scheme corresponds to performing the information dispersal algorithm by utilizing a second set of parameters. In various embodiments, the new first object identifier indicates that the at least one second encoded data slice is preferred over the at least one first encoded data slice when performing access requests.

In various embodiments, the new object first identifier is generated by utilizing a reversible function on the original first object identifier. The first slice identifier is generated based on the original first object identifier. A derived original first object identifier is generated by utilizing an inverse function of the reversible function on the new first object identifier. A derived first slice identifier is generated based on the derived original first object identifier, and the derived second slice identifier is generated by performing a deterministic function on the first slice identifier. In various embodiments, the reversible function includes multiplying the original first object identifier by a large prime number to generate the new first object identifier, and determining that the first data object is stored under multiple encoding schemes includes determining that a quotient of a division of the new first object identifier by the large prime number is an integer, where the derived original first object identifier is based on the quotient.

In various embodiments, a second access request to access a second data object is received via the network, where the second data object is stored as at least one third encoded data slice that is encoded under a third encoding scheme, and where no encoded data slices are stored under additional encoding schemes that correspond to the second data object. A derived third slice identifier is generated in response to determining that the second data object requested for access is not stored under multiple encoding schemes. A second read request that includes the derived third slice identifier transmitting via the network to access the at least one third encoded data slice. In various embodiments, an original second object identifier is divided by a large prime number, and the derived third slice identifier is generated in response to determining that a quotient of the division is not an integer.

In various embodiments, the encoding scheme can include a dispersed storage error encoding process. When a computing device, which can include user device 12-14, has data to store it can disperse storage error encode the data in accordance with a dispersed storage error encoding process based on dispersed storage error encoding parameters. The computing device can perform the encoding itself, or in various embodiments, can transmit the data to a DST processing unit as discussed, and the encoding can be performed at the DST processing unit. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number of encoded data slices per encoding of a data segment i.e., in a set of encoded data slices); a decode threshold number of encoded data slices of a set of encoded data slices that are needed to recover the data segment; a read threshold number of encoded data slices to indicate a number of encoded data slices per set to be read from storage for decoding of the data segment; and/or a write threshold number to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

For example, Cauchy Reed-Solomon can be selected as the encoding function. The data segmenting protocol is to divide the data object into fixed sized data segments, and the per data segment encoding values include: a pillar width of 5, a decode threshold of 3, a read threshold of 4, and a write threshold of 4. In accordance with the data segmenting protocol, the computing device can divide the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

In various embodiments, the computing device can then disperse storage error encodes a data segment using the selected encoding function (e.g., Cauchy Reed-Solomon) to produce a set of encoded data slices. A generic Cauchy Reed-Solomon encoding function can include an encoding matrix (EM), a data matrix (DM), and a coded matrix (CM). The size of the encoding matrix is dependent on the pillar width number (T) and the decode threshold number (D) of selected per data segment encoding values. To produce the data matrix, the data segment is divided into a plurality of data blocks and the data blocks are arranged into D number of rows with Z data blocks per row. Note that Z is a function of the number of data blocks created from the data segment and the decode threshold number. The coded matrix is produced by matrix multiplying the data matrix by the encoding matrix.

In various embodiments, the computing device can create a slice name for each encoded data slice in the set of encoded data slices. The slice name (SN) can include a pillar number of the encoded data slice (e.g., one of 1-T), a data segment number (e.g., one of 1-Y), a vault identifier, a data object identifier, and may further include revision level information of the encoded data slices. The slice name functions as, at least part of, a DSN address for the encoded data slice for storage and retrieval from the DSN memory, which can include one or more storage units such as DST storage unit 36 of FIG. 1. As a result of encoding, the computing device can produce a plurality of sets of encoded data slices, which are provided with their respective slice names to the storage units for storage.

In various embodiments, the computing device can retrieve from the storage units at least the decode threshold number of encoded data slices per data segment. For example, the computing device can retrieve a read threshold number of encoded data slices. To recover a data segment from a decode threshold number of encoded data slices, the computing device can use a decoding function. The decoding function can be essentially an inverse of the encoding function. The coded matrix can include a decode threshold number of rows (e.g., three in this example) and the decoding matrix can be an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 4:
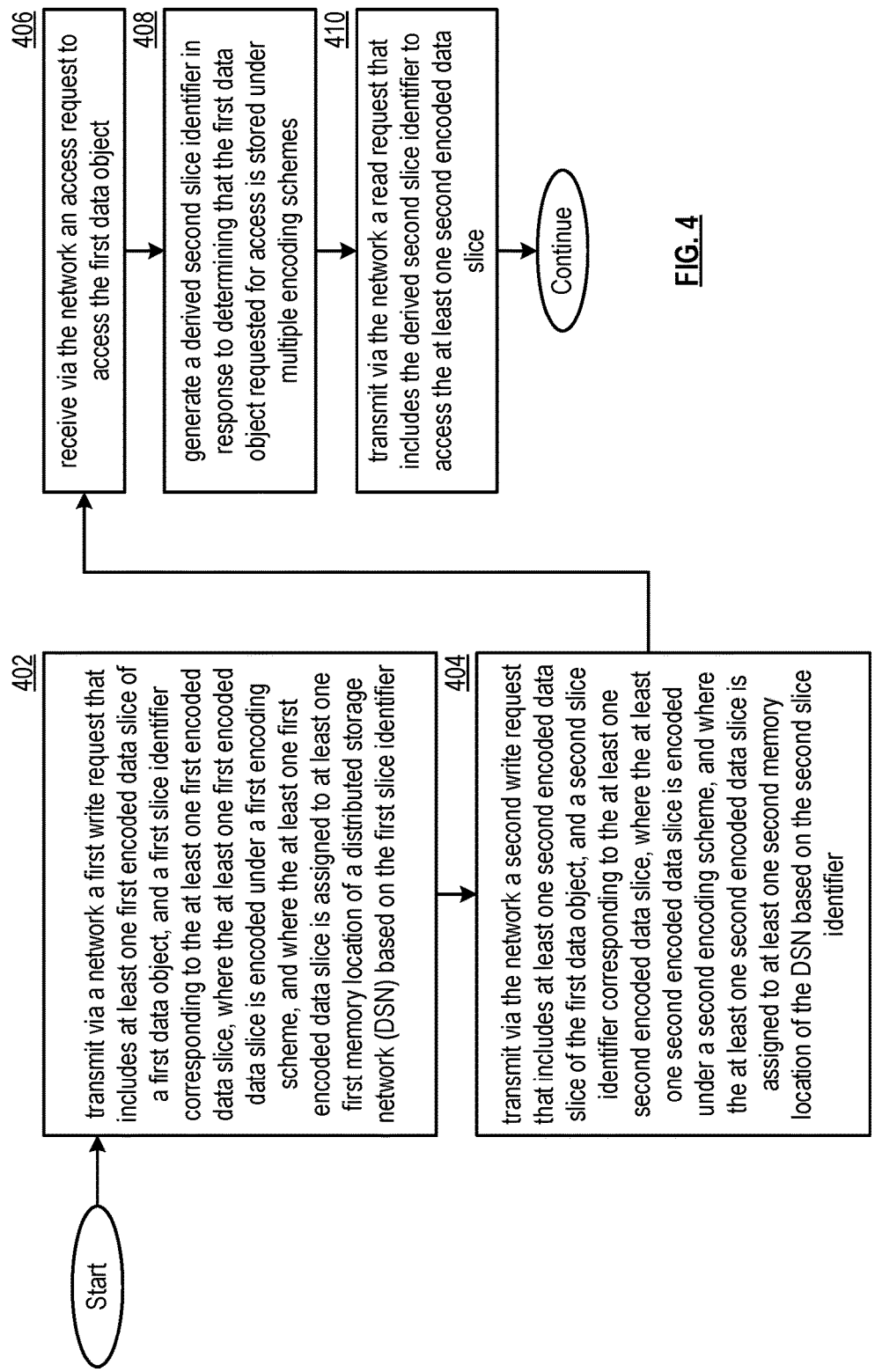
FIG. 4 is a flowchart illustrating an example of indicating multiple encoding schemes in accordance with the present invention.

FIG. 4 is a flowchart illustrating an example of indicating multiple encoding schemes. In particular, a method is presented for use in conjunction with one or more functions and features described in conjunction with FIGS. 1-3 is presented for execution by a DST processing unit that includes a processor or via another processing system of a dispersed storage network that includes at least one processor and memory that stores instruction that configure the processor or processors to perform the steps described below. Step 402 includes transmitting via a network a first write request that includes at least one first encoded data slice of a first data object, and a first slice identifier corresponding to the at least one first encoded data slice, where the at least one first encoded data slice is encoded under a first encoding scheme, and where the at least one first encoded data slice is assigned to at least one first memory location of a distributed storage network (DSN) based on the first slice identifier. Step 404 includes transmitting via the network a second write request that includes at least one second encoded data slice of the first data object, and a second slice identifier corresponding to the at least one second encoded data slice, where the at least one second encoded data slice is encoded under a second encoding scheme, and where the at least one second encoded data slice is assigned to at least one second memory location of the DSN based on the second slice identifier. Step 406 includes receiving via the network a first access request to access the first data object. Step 408 includes generating a derived second slice identifier in response to determining that the first data object requested for access is stored under multiple encoding schemes. Step 410 includes transmitting via the network a first read request that includes the derived second slice identifier to access the at least one second encoded data slice.

In various embodiments, the second slice identifier is generated by performing a deterministic function on the first slice identifier. A derived first slice identifier is generated based on the first access request, and the derived second slice identifier is generated by performing the deterministic function on the derived first slice identifier. In various embodiments, the deterministic function is a hash function or a mask generating function.

In various embodiments, a new first object identifier is generated to indicate the first data object. An original first object identifier that identifies the first data object is replaced with the new first object identifier. In various embodiments, the new first object identifier is transmitted to a requesting entity in response to generating the new first object identifier. The first access request is received from the requesting entity, and the first access request includes the new first object identifier.

In various embodiments, generating the new first object identifier includes updating a reserved field of the original first object identifier. A test is performed on the reserved field in response to receiving the new first object identifier in the first access request, and the derived second slice identifier is generated in response to a result of the test indicating that the first data object is stored under multiple encoding schemes. In various embodiments, the first encoding scheme corresponds to performing an information dispersal algorithm by utilizing a first set of parameters, and second encoding scheme corresponds to performing the information dispersal algorithm by utilizing a second set of parameters. In various embodiments, the new first object identifier indicates that the at least one second encoded data slice is preferred over the at least one first encoded data slice when performing access requests.

In various embodiments, the new object first identifier is generated by utilizing a reversible function on the original first object identifier. The first slice identifier is generated based on the original first object identifier. A derived original first object identifier is generated by utilizing an inverse function of the reversible function on the new first object identifier. A derived first slice identifier is generated based on the derived original first object identifier, and the derived second slice identifier is generated by performing a deterministic function on the first slice identifier. In various embodiments, the reversible function includes multiplying the original first object identifier by a large prime number to generate the new first object identifier, and determining that the first data object is stored under multiple encoding schemes includes determining that a quotient of a division of the new first object identifier by the large prime number is an integer, where the derived original first object identifier is based on the quotient.

In various embodiments, a second access request to access a second data object is received via the network, where the second data object is stored as at least one third encoded data slice that is encoded under a third encoding scheme, and where no encoded data slices are stored under additional encoding schemes that correspond to the second data object. A derived third slice identifier is generated in response to determining that the second data object requested for access is not stored under multiple encoding schemes. A second read request that includes the derived third slice identifier transmitting via the network to access the at least one third encoded data slice. In various embodiments, an original second object identifier is divided by a large prime number, and the derived third slice identifier is generated in response to determining that a quotient of the division is not an integer.

The method described above in conjunction with the computing device and the storage units can alternatively be performed by other modules of the dispersed storage network or by other devices. For example, any combination of a first module, a second module, a third module, a fourth module, etc. of the computing device and the storage units may perform the method described above. In addition, at least one memory section (e.g., a first memory section, a second memory section, a third memory section, a fourth memory section, a fifth memory section, a sixth memory section, etc. of a non-transitory computer readable storage medium) that stores operational instructions can, when executed by one or more processing modules of one or more computing devices and/or by the storage units of the dispersed storage network (DSN), cause the one or more computing devices and/or the storage units to perform any or all of the method steps described above.

In various embodiments, a non-transitory computer readable storage medium includes at least one memory section that stores operational instructions that, when executed by a processing system of a dispersed storage network (DSN) that includes a processor and a memory, causes the processing system to transmit via a network a first write request that includes at least one first encoded data slice of a first data object that is encoded under a first encoding scheme, and a first slice identifier corresponding to the at least one first encoded data slice, which is assigned to at least one first memory location of the DSN based on the first slice identifier. A second write request that includes at least one second encoded data slice of the first data object that is encoded under a second encoding scheme, and a second slice identifier corresponding to the at least one second encoded data slice, is transmitted via the network, where the at least one second encoded data slice is assigned to at least one second memory location of the DSN based on the second slice identifier. A first access request to access the first data object is received via the network. A derived second slice identifier is generated in response to determining that the first data object requested for access is stored under multiple encoding schemes. A first read request that includes the derived second slice identifier to access the at least one second encoded data slice is transmitted via the network.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/ or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by a dispersed storage and task (DST) processing unit that includes a processor, the method comprises:
    transmitting via a network a first write request that includes at least one first encoded data slice of a first data object, and an original first slice identifier corresponding to the at least one first encoded data slice, wherein the at least one first encoded data slice is encoded under a first encoding scheme, and wherein the at least one first encoded data slice is assigned to at least one first memory location of a distributed storage network (DSN) based on the original first slice identifier;
    transmitting via the network a second write request that includes at least one second encoded data slice of the first data object, and a second slice identifier corresponding to the at least one second encoded data slice, wherein the at least one second encoded data slice is encoded under a second encoding scheme, and wherein the at least one second encoded data slice is assigned to at least one second memory location of the DSN based on the second slice identifier;
    receiving via the network a first access request to access the first data object;
    generating a derived second slice identifier in response to determining that the first data object requested for access is stored under multiple encoding schemes;
    transmitting via the network a first read request that includes the derived second slice identifier to access the at least one second encoded data slice;
    generating a new first object identifier to indicate the first data object utilizing a reversible function on the original first object identifier, by:
        generating the first slice identifier based on the original first object identifier;
        generating a derived original first object identifier by utilizing an inverse function of the reversible function on the new first object identifier; and
        generating a derived first slice identifier based on the derived original first object identifier;
        wherein the derived second slice identifier is generated by performing a deterministic function on the first slice identifier; and
        wherein the reversible function includes multiplying the original first object identifier by a large prime number to generate the new first object identifier, and wherein determining that the first data object is stored under multiple encoding schemes includes determining that a quotient of a division of the new first object identifier by the large prime number is an integer, and wherein the derived original first object identifier is based on the quotient; and
    replacing an original first object identifier that identifies the first data object with the new first object identifier.

2. The method of claim 1, further comprising:
    generating the second slice identifier by performing a deterministic function on the first slice identifier; and
    generating a derived first slice identifier based on the first access request;
    wherein the derived second slice identifier is generated by performing the deterministic function on the derived first slice identifier.

3. The method of claim 2, wherein the deterministic function is one of: a hash function or a mask generating function.

4. The method of claim 1, further comprising transmitting the new first object identifier to a requesting entity in response to generating the new first object identifier, wherein the first access request is received from the requesting entity, and wherein the first access request includes the new first object identifier.

5. The method of claim 4, wherein generating the new first object identifier includes updating a reserved field of the original first object identifier, further comprising performing a test on the reserved field in response to receiving the new first object identifier in the first access request, and wherein the derived second slice identifier is generated in response to a result of the test indicating that the first data object is stored under multiple encoding schemes.

6. The method of claim 1, further comprising:
    receiving a second access request via the network to access a second data object, wherein the second data object is stored as at least one third encoded data slice, and wherein no encoded data slices are stored under additional encoding schemes that correspond to the second data object;
    generating a derived third slice identifier in response to determining that the second data object requested for access is not stored under multiple encoding schemes; and
    transmitting via the network a second read request that includes the derived third slice identifier to access the at least one third encoded data slice.

7. The method of claim 6, further comprising dividing an original second object identifier by a large prime number, wherein the derived third slice identifier is generated in response to determining that a quotient of the division is not an integer.

8. The method of claim 1, wherein the first encoding scheme corresponds to performing an information dispersal algorithm by utilizing a first set of parameters, and wherein the second encoding scheme corresponds to performing the information dispersal algorithm by utilizing a second set of parameters.

9. The method of claim 1, wherein the new first object identifier indicates that the at least one second encoded data slice is preferred over the at least one first encoded data slice when performing access requests.

10. A processing system of a dispersed storage and task (DST) processing unit comprises:
    at least one processor;
    a memory that stores operational instructions, that when executed by the at least one processor cause the processing system to:

transmit via a network a first write request that includes at least one first encoded data slice of a first data object, and an original first slice identifier corresponding to the at least one first encoded data slice, wherein the at least one first encoded data slice is encoded under a first encoding scheme, and wherein the at least one first encoded data slice is assigned to at least one first memory location of a distributed storage network (DSN) based on the original first slice identifier;

transmit via the network a second write request that includes at least one second encoded data slice of the first data object, and a second slice identifier corresponding to the at least one second encoded data slice, wherein the at least one second encoded data slice is encoded under a second encoding scheme, and wherein the at least one second encoded data slice is assigned to at least one second memory location of the DSN based on the second slice identifier;

receive via the network an first access request to access the first data object;

generate a derived second slice identifier in response to determining that the first data object requested for access is stored under multiple encoding schemes;

transmit via the network a first read request that includes the derived second slice identifier to access the at least one second encoded data slice;

generate a new first object identifier to indicate the first data object utilizing a reversible function on the original first object identifier, by:
 generating the first slice identifier based on the original first object identifier;
 generating a derived original first object identifier by utilizing an inverse function of the reversible function on the new first object identifier; and
 generating a derived first slice identifier based on the derived original first object identifier;
 wherein the derived second slice identifier is generated by performing a deterministic function on the first slice identifier; and
 wherein the reversible function includes multiplying the original first object identifier by a large prime number to generate the new first object identifier, and wherein determining that the first data object is stored under multiple encoding schemes includes determining that a quotient of a division of the new first object identifier by the large prime number is an integer, and wherein the derived original first object identifier is based on the quotient; and replace an original first object identifier that identifies the first data object with the new first object identifier.

11. The processing system of claim 10, wherein the operational instructions, when executed by the at least one processor, further cause the processing system to:

generate the second slice identifier by performing a deterministic function on the first slice identifier; and generate a derived first slice identifier based on the first access request;

wherein the derived second slice identifier is generated by performing the deterministic function on the derived first slice identifier.

12. The processing system of claim 10, wherein the operational instructions, when executed by the at least one processor, further cause the processing system to:

receiving a second access request via the network to access a second data object, wherein the second data object is stored as at least one third encoded data slice, and wherein no encoded data slices are stored under additional encoding schemes that correspond to the second data object;

generating a derived third slice identifier in response to determining that the second data object requested for access is not stored under multiple encoding schemes; and transmitting via the network a second read request that includes the derived third slice identifier to access the at least one third encoded data slice.

13. The processing system of claim 10, wherein the new first object identifier indicates that the at least one second encoded data slice is preferred over the at least one first encoded data slice when performing access requests.

14. A non-transitory computer readable storage medium comprises:

at least one memory section that stores operational instructions that, when executed by a processing system of a dispersed storage network (DSN) that includes a processor and a memory, causes the processing system to:

transmit via a network a first write request that includes at least one first encoded data slice of a first data object, and an original first slice identifier corresponding to the at least one first encoded data slice, wherein the at least one first encoded data slice is encoded under a first encoding scheme, and wherein the at least one first encoded data slice is assigned to at least one first memory location of the DSN based on the original first slice identifier;

transmit via the network a second write request that includes at least one second encoded data slice of the first data object, and a second slice identifier corresponding to the at least one second encoded data slice, wherein the at least one second encoded data slice is encoded under a second encoding scheme, and wherein the at least one second encoded data slice is assigned to at least one second memory location of the DSN based on the second slice identifier;

receive via the network a first access request to access the first data object;

generate a derived second slice identifier in response to determining that the first data object requested for access is stored under multiple encoding schemes;

transmit via the network a first read request that includes the derived second slice identifier to access the at least one second encoded data slice;

generate a new first object identifier to indicate the first data object utilizing a reversible function on the original first object identifier, by:
 generating the first slice identifier based on the original first object identifier;
 generating a derived original first object identifier by utilizing an inverse function of the reversible function on the new first object identifier; and
 generating a derived first slice identifier based on the derived original first object identifier;
 wherein the derived second slice identifier is generated by performing a deterministic function on the first slice identifier; and
 wherein the reversible function includes multiplying the original first object identifier by a large prime number to generate the new first object identifier, and wherein determining that the first data object is stored under multiple encoding schemes includes determining that a quotient of a division of the new first object identifier by the large prime number is an integer, and wherein the derived original first object identifier is based on the quotient; and replace an original first object identifier that identifies the first data object with the new first object identifier.

* * * * *